United States Patent
McLean et al.

(10) Patent No.: US 7,168,226 B2
(45) Date of Patent: Jan. 30, 2007

(54) INDEPENDENT HYDRAULIC HEADER LIFT AND FLOTATION SYSTEM

(75) Inventors: Kenneth W. McLean, New Holland, PA (US); Douglas R. Otto, New Holland, PA (US); David M. DeChristopher, Akron, PA (US); Robert L. Fackler, Ephrata, PA (US); Charles H. Hoffman, New Holland, PA (US); Donald L. Osborne, Quarryville, PA (US); Stephen V. Paulin, Alpharetta, GA (US)

(73) Assignee: CNH America LLC, New Holland, PA (US)

(*) Notice: Subject to any disclaimer, the term of this patent is extended or adjusted under 35 U.S.C. 154(b) by 358 days.

(21) Appl. No.: 10/822,465

(22) Filed: Apr. 12, 2004

(65) Prior Publication Data

US 2006/0144028 A1 Jul. 6, 2006

Related U.S. Application Data

(63) Continuation of application No. 10/814,409, filed on Mar. 31, 2004, now abandoned.

(51) Int. Cl.
*A01D 41/14* (2006.01)
*A01D 46/08* (2006.01)
*A01D 75/28* (2006.01)

(52) U.S. Cl. .................................................. 56/10.2 E

(58) Field of Classification Search .................. 56/208, 56/209, 10.8, 10.2 A, 10.2 E; 60/469, 413; 414/641; 172/260.4, 260.5, 464
See application file for complete search history.

(56) References Cited

U.S. PATENT DOCUMENTS

| | | | |
|---|---|---|---|
| 3,908,345 A * | 9/1975 | Oni et al. | 56/208 |
| 4,523,886 A | 6/1985 | Reeves | 414/641 |
| 4,527,381 A | 7/1985 | Mann | 56/209 |
| 4,622,803 A | 11/1986 | Lech | 56/10.2 |
| 4,648,466 A * | 3/1987 | Baker et al. | 172/260.5 |
| 4,676,053 A | 6/1987 | Pruitt | 56/208 |
| 4,733,523 A | 3/1988 | Dedeyne et al. | 56/209 |
| 5,613,352 A | 3/1997 | Panoushek et al. | 56/10.2 E |
| 5,778,644 A | 7/1998 | Keller et al. | 56/11.2 |
| 5,906,089 A | 5/1999 | Guinn et al. | 56/10.2 |
| 5,964,077 A | 10/1999 | Guinn | 56/10.2 |
| 5,983,615 A | 11/1999 | Scmid et al. | 56/208 |
| 6,151,874 A | 11/2000 | Eis | 56/10.2 |

* cited by examiner

*Primary Examiner*—Árpád Fábián Kovács
(74) *Attorney, Agent, or Firm*—John William Stader; Michael G. Harms

(57) ABSTRACT

A hydraulic lift/flotation system for the header of a crop harvesting machine wherein each side of the header is supported by a single cylinder, which performs both the flotation and lift functions. For even lifting and flotation of an unbalanced header, each cylinder has its own control valve, pump, and accumulator. The operator sets the desired flotation force by actuating rocker switches; one switch position allows hydraulic oil to enter an accumulator to reduce header contact force with the ground. The other position allows oil to exit the accumulator to increase header contact force with the ground. To evenly float an unbalanced header, separate switches adjust each side independently. Once the flotation forces are set, the control valves will return to this preset flotation condition whenever float mode is selected, regardless of subsequent header lift and lower operations.

17 Claims, 3 Drawing Sheets

INDEPENDENT HYDRAULIC HEADER LIFT AND FLOTATION SYSTEM

CROSS-REFERENCE TO RELATED APPLICATIONS

This application is a continuation of U.S. patent application No. 10/814,409, filed Mar. 31, 2004 and abandoned on Apr. 7, 2005.

This application relates to a utility patent application filed on the same date as the instant application, entitled "Non-Independent Hydraulic Header Lift and Flotation System", and bearing 10/814,923.

BACKGROUND OF THE INVENTION

The present invention relates generally to harvesting machines of the type that require flotation systems for permitting their headers to ride lightly up and over rises in the terrain during field operation, and particularly to a hydraulic header lift and flotation system for such a machine that will provide the dual functions of header lift and flotation.

Header flotation systems typically use extension springs, either hydraulically or manually adjusted, bell cranks and other linkages to provide the desired function. The structure generally requires numerous components and large extension springs, and it is quite difficult to develop the mechanical components required to float the broad range of header sizes available—even requiring different tractors or frames having their own flotation systems designed to meet their own particular header weight requirements.

Some manufacturers are using an accumulator and hydraulic cylinders to perform the flotation function. These machines typically use separate hydraulic cylinders for the lift and flotation functions, and they lack the capability of independently adjusting the flotation force for each side of the header. Additionally, some headers are not inherently balanced side to side. Special considerations must be made to float and lift these headers evenly by adding ballast, which can become unreasonably heavy or awkward, or modifying the lift geometry of one side.

It would be quite beneficial to have a header lift and flotation system that employs a single hydraulic cylinder for each side of the header, simplifying the controls and mechanical components necessary to perform these functions.

SUMMARY OF THE INVENTION

Accordingly, it is an object of the present invention is to provide a hydraulic lift and flotation system for the header of a crop harvesting machine that employs a single hydraulic cylinder for each side of the header.

Another object of the present invention is to provide a hydraulic lift and flotation system to be used with both heavy and light headers/conditioners, i.e., a broad range of header sizes and weights.

It is another object of the instant invention to provide a more simplified structure that presents greater flexibility in locating accumulators as opposed to extension springs and necessary linkages, with fewer pivot points to wear and fewer parts to manufacture and assemble.

It is still another object of the instant invention to provide a flotation and lift system that requires no dealer or customer assembly.

It is an even still further object of the instant invention to provide a hydraulic header flotation and lift system that reduces hydraulic and mechanical shock loading when raising the header in a less than fully raised position, improving the ride comfort for the operator and improving hydraulic and structural durability of the harvester.

It is yet another object of this invention to provide an improved hydraulic header lift and flotation system that is durable in construction, inexpensive of manufacture, carefree of maintenance, facile in assemblage, and simple and effective in use.

These and other objects are attained by providing a hydraulic lift/flotation system for the header of a crop harvesting machine. Each side of the header is supported by a single cylinder that performs both the flotation and lift functions. For even lifting and flotation of an unbalanced header, each cylinder has its own control valve, pump, and accumulator, i.e., the left and right systems are generally mirror images of each other. The operator sets the desired flotation force by actuating rocker switches; one switch position allows hydraulic oil to enter an accumulator to reduce header contact force with the ground. The other position allows oil to exit the accumulator to increase header contact force with the ground. To evenly float an unbalanced header, separate switches adjust each side independently. Once the flotation forces are set, the control valves will return to this preset flotation condition whenever float mode is selected, regardless of subsequent header lift and lower operations.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
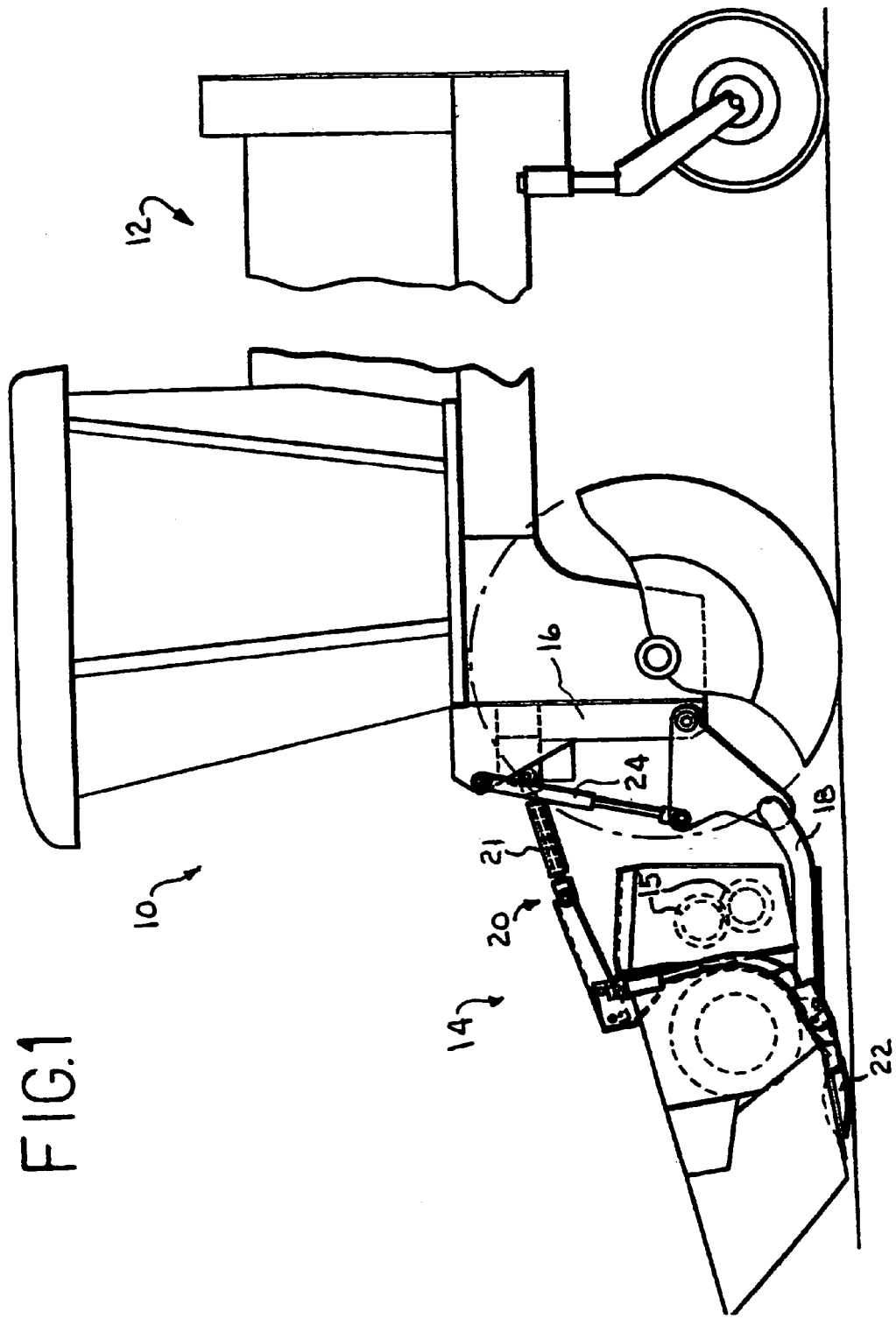
FIG. 1 is a partial side elevational view of a crop harvesting machine of the type with which the invention may be used, also showing a simplified side view of the lift and flotation system of the instant invention.

FIG. 1 shows the present invention utilized in connection with a self-propelled windrower 10; however, it will be appreciated that the principles of the present invention are not limited to a self-propelled windrower, or to any specific type of harvesting machine.

In the illustrated embodiment, the self-propelled windrower 10 comprises a tractor 12 and a header 14, the header 14 being attached to the front end of the frame 16 or chassis of the tractor 12. The header may be of generally any suitable construction and design, and may include not only crop-harvesting mechanisms, but also crop conditioners such as elongate rolls 15. Such attachment of the header 14 to the frame 16 is achieved through a pair of lower arms 18 (only the left one being shown, the right being generally the same) pivoted at one end to the frame 16 and at the other end to the header 14, as well as through a central upper link 20. The link 20 may take the form of a single double-acting hydraulic cylinder 21 whose extension and retraction is controlled by the operator to remotely control the angle of sickle bar 22 on the lower front of the header 14.

A single lift/flotation cylinder 24, interconnecting the lower arm 18 and the frame 16 supports each side of the header, i.e., each side of the header is supported by its own lift/flotation cylinder (again, only the left one being shown in this FIG. 1).

More specifically, the control system accomplishes two generally separate control functions, one for the right side lift/flotation cylinder and one for the left, so there are actually two control subsystems, one generally the operational mirror image of the other. In actuality, the two may be totally separate, or they may share some operational components and for a single cylinder structure.

Figure 2:
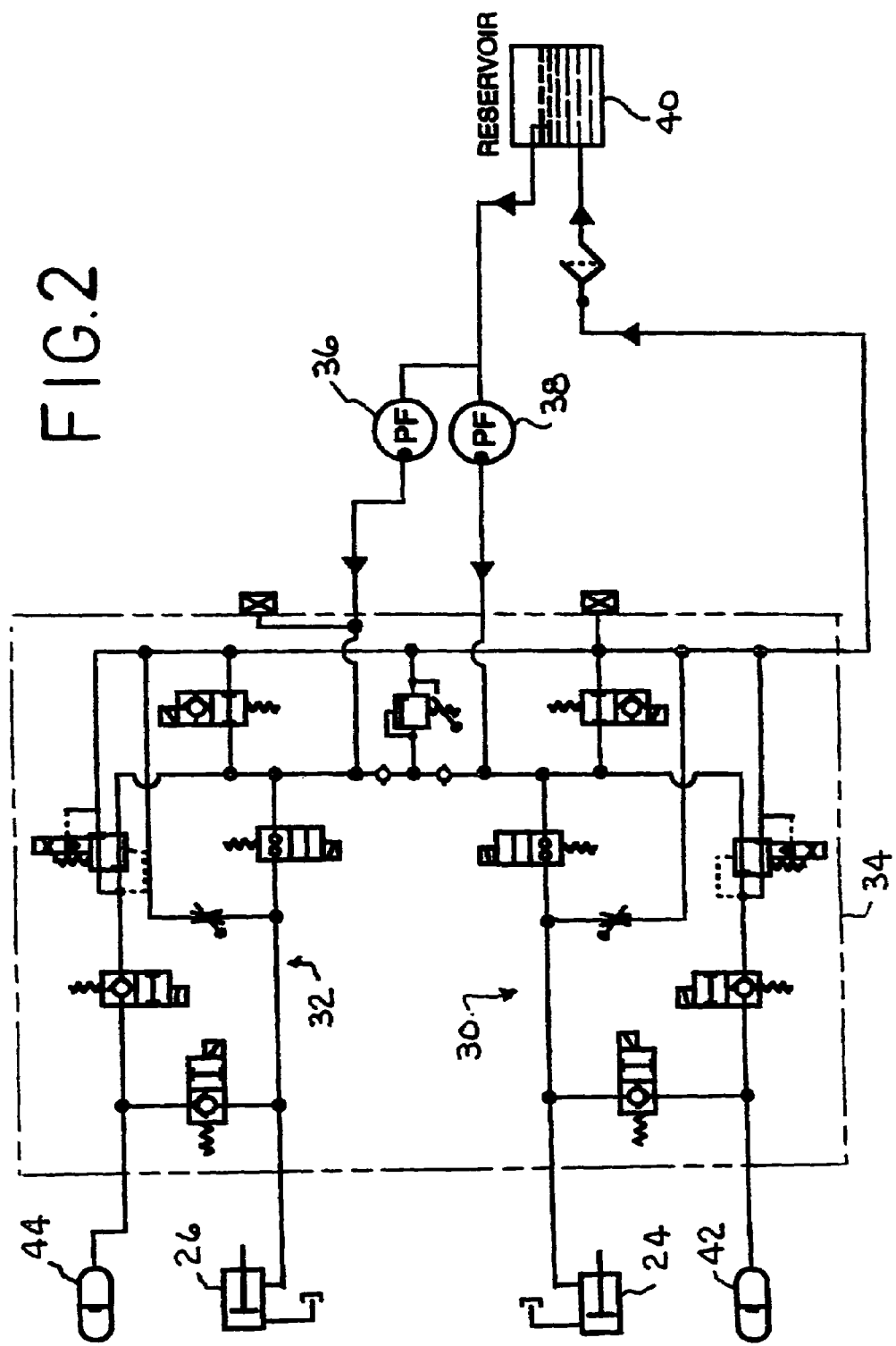
FIG. 2 is a hydraulic schematic view of one embodiment of the hydraulic system of the instant invention.

Directing attention now to FIG. 2, the hydraulic control system for left cylinder 24 and right cylinder 26 can be seen to include two basically similar electro-hydraulic subsystems 30 and 32. For convenience of assembly and operation, the majority of the components are housed in a single valve body 34 with appropriately located ports and other necessary connection devices and fixtures. A pair of fixed displacement pumps 36, 38 move the hydraulic fluid into respective subsystems 30, 32 from reservoir 40, through the various circuits as directed by control valves, to accumulators 42, 44, to hydraulic cylinders 24, 26 and back to reservoir 40 as appropriate.

Figure 3:
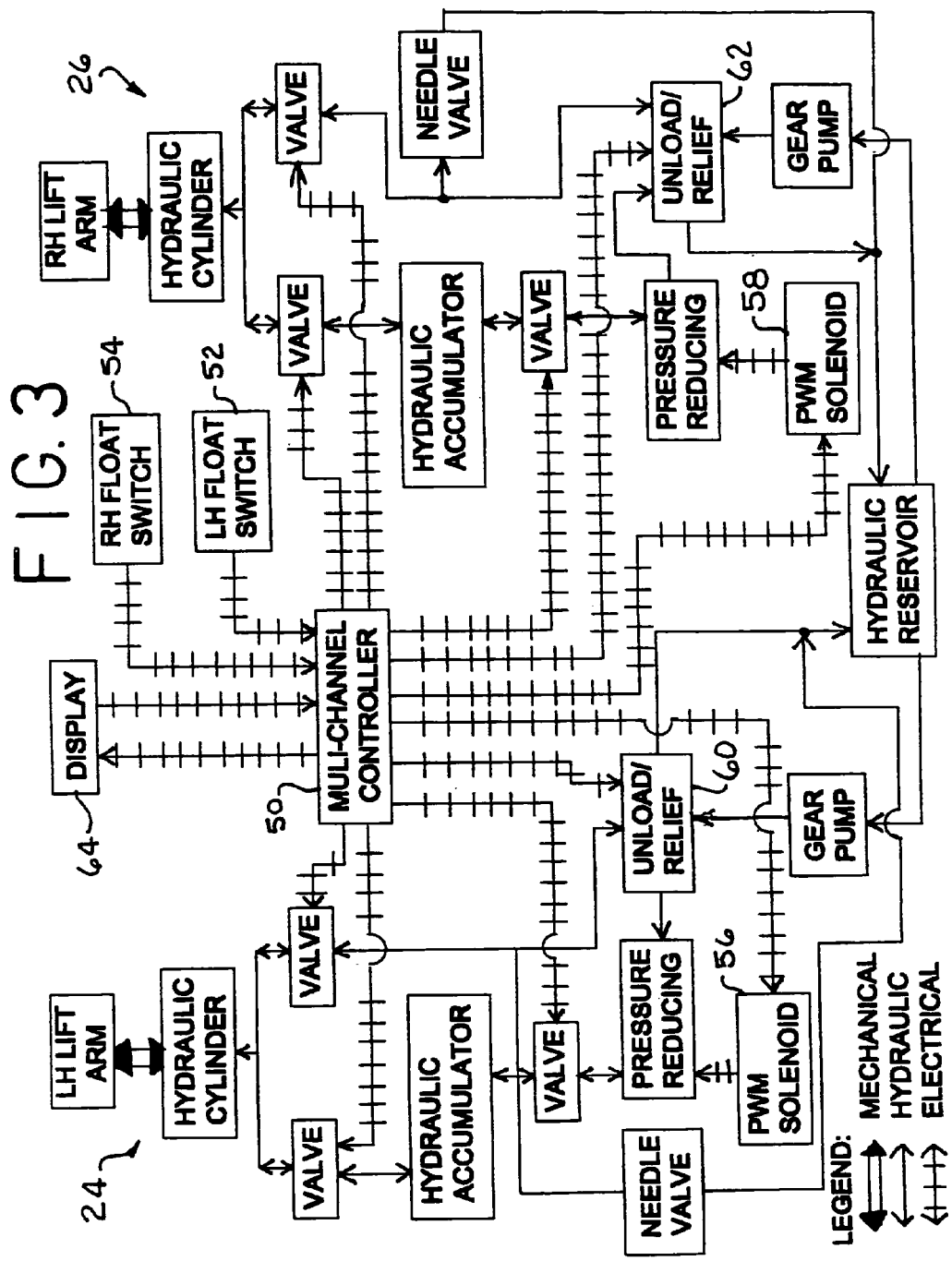
FIG. 3 is a schematic of the hydraulic, mechanical and electrical sub-systems that cooperate to produce the system of FIGS. 1 and 2.

FIG. 3 provides a more detailed depiction of the complete control system and subsystems The left hand ("LH") and right hand ("RH") hydraulic systems, as shown also in FIG. 2, additionally depict the electrical control and mechanical subsystems. Importantly, this figure depicts the multi-channel programmable controller 50 which exchanges electrical signals from the LH and RH float switches 52, 54, the PWM (pulse width modulated) solenoids 56, 58, the unload/relief valves 60, 62, and other valves to manage the lift and flotation functions as established by the operator through the appropriate switches and shown on display 64.

In operation, each side of the header is supported by a single cylinder that performs both the flotation and lift functions. For even lifting and flotation of an unbalanced header, each cylinder has its own control valve, pump, and accumulator. The operator sets the desired flotation force by actuating rocker switches 52, 54 located on the operator's console. One switch position allows hydraulic oil to enter an accumulator (increasing the hydraulic pressure) which reduces the header contact force (flotation) with the ground. The other position allows oil to exit that accumulator (reducing the hydraulic pressure) which increases the header contact force with the ground. To evenly float unbalanced headers, there are separate switches to adjust each side independently. Once the flotation forces are set, the control valves will return to this preset flotation condition whenever the float mode is selected, irrespective of subsequent header lift and lower operations.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In a harvesting machine having a frame adapted for movement over the ground, the frame having a front end, an opposing rear end, and an operator's platform, an elongate crop harvesting header having a first end and a second opposing end, the first and second ends defining the length of the elongate header, the header supported at first and second support points, intermediate the first and second ends, by the frame across the front end of the frame for generally vertical movement relative to the ground, the improvement comprising:

a header lift and flotation system interconnecting the header and the frame for selectively raising and lowering the header relative to the ground and setting flotation parameters, the header lift and flotation system including:

left and right hand hydraulic cylinders interconnecting the frame and the header adjacent the respective first and second support points;

a hydraulic fluid reservoir;

substantially independent left and right hand electro-hydraulic circuits, each circuit including an independent hydraulic pump and at least one valve operated by electrical signals, interconnecting the hydraulic fluid reservoir and the respective left and right hand hydraulic cylinders;

left and right hand manually manipulated switches:

an electronic programmable controller interconnecting the switches and the valves such that independent manipulation of the switches causes the controller to emit electrical signals to the valves to establish independent flotation and lift settings.

2. The improvement of claim 1, wherein:

each left and right electro-hydraulic circuit further includes hydraulic accumulator.

3. The improvement of claim 2, wherein:

the switches are located on the operator's platform.

4. The improvement of claim 3, wherein:

the switches are rocker switches.

5. The improvement of claim 4, wherein:

each of the left and right hand switches has a first position that signals the controller to allow hydraulic oil to enter the respective accumulator to reduce header contact force with the ground.

6. The improvement of claim 5, wherein:

each of the left and right band switches has a second position that signals the controller to allow hydraulic oil to exit the respective accumulator to increase header contact force with the ground.

7. The improvement of claim 6, wherein the left and right hand switches operate independently of each other.

8. In a harvesting machine having a frame adapted for movement over the ground, the frame having a front end, an opposing rear end, and an operator's platform, an elongate crop harvesting header having a first end and a second opposing end, the first and second ends defining the length of the elongate header, the header supported at first and second support points, intermediate the first and second ends, by the frame across the front end of the frame for generally vertical movement relative to the ground, the improvement comprising:
- a header lift and flotation system interconnecting the header and the frame for selectively raising and lowering the header relative to the ground and setting flotation parameters, the header lift and flotation system including:
- left and right hand hydraulic cylinders interconnecting the frame and the header adjacent the respective first and second support points;
- a hydraulic fluid reservoir;
- substantially independent left and right hand electro-hydraulic circuits, each circuit including an independent hydraulic pump and at least one valve operated by electrical signals, interconnecting the hydraulic fluid reservoir and the respective left and right hand hydraulic cylinders;
- left and right hand manually manipulated switches;
- an electronic programmable controller interconnecting the switches and the valves such that independent manipulation of the switches causes the controller to emit electrical signals to the valves to establish independent flotation and lift settings for the left and right hand hydraulic cylinders.

9. The improvement of claim 8, wherein:
each left and right electro-hydraulic circuit further includes hydraulic accumulator.

10. The improvement of claim 9, wherein:
the switches are located on the operator's platform and are rocker-type switches.

11. The improvement of claim 10, wherein:
each of the left and right hand switches has a first position that signals the controller to allow hydraulic oil to enter the respective accumulator to reduce header contact force with the ground, and
each of the left and right hand switches has a second position that signals the controller to allow hydraulic oil to exit the respective accumulator to increase header contact force with the ground.

12. The improvement of claim 11 wherein:
the left and right hand switches operate independently of each other.

13. A crop harvesting machine comprising:
- a self-propelled frame adapted for movement over the ground, the frame having a front end, an opposing rear end;
- an operator's platform affixed to and supported by the frame;
- an elongate crop harvesting header having a first end and a second opposing end, the first and second ends defining the length of the elongate header, the header supported at first and second support points, intermediate the first and second ends, by the frame across the front end of the frame for generally vertical movement relative to the ground;
- a header lift and flotation system interconnecting the header and the frame for selectively raising and lowering the header relative to the ground and setting flotation parameters, the header lift and flotation system including:
  - left and right hand hydraulic cylinders interconnecting the frame and the header adjacent the respective first and second support points;
  - a hydraulic fluid reservoir;
  - substantially independent left and right hand electro-hydraulic circuits, each circuit including an independent hydraulic pump and at least one valve operated by electrical signals, interconnecting the hydraulic fluid reservoir and the respective left and right hand hydraulic cylinders;
  - left and right hand manually manipulated switches; and
- an electronic programmable controller interconnecting the switches and the valves such that independent manipulation of the switches causes the controller to emit electrical signals to the valves to establish independent flotation and lift settings for the left and right hand hydraulic cylinders.

14. The crop harvesting machine of claim 13, wherein:
each left and right electro-hydraulic circuit further includes hydraulic accumulator.

15. The improvement of claim 14, wherein:
the switches are located on the operator's platform.

16. The improvement of claim 13, wherein:
the switches are rocker switches;
each of the left and right band switches has a first position that signals the controller to allow hydraulic oil to enter the respective accumulator to reduce header contact force with the ground; and
each of the left and right hand switches has a second position that signals the controller to allow hydraulic oil to exit the respective accumulator to increase header contact force with the ground.

17. The improvement of claim 16, wherein
the left and right hand switches operate independently of each other.

* * * * *